United States Patent
Aloui et al.

(10) Patent No.: US 12,355,144 B2
(45) Date of Patent: Jul. 8, 2025

(54) COMMUNICATING DEVICE FOR A MOTOR VEHICLE

(71) Applicant: Continental Automotive Technologies GmbH, Hannover (DE)

(72) Inventors: Brahim Aloui, Toulouse (FR); Guilherme Germano Buchmeier, Toulouse (FR)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 188 days.

(21) Appl. No.: 18/212,852

(22) Filed: Jun. 22, 2023

(65) Prior Publication Data

US 2023/0420831 A1 Dec. 28, 2023

(30) Foreign Application Priority Data

Jun. 23, 2022 (FR) ..................................... 2206231

(51) Int. Cl.
| | | |
|---|---|---|
| *H01Q 1/38* | (2006.01) | |
| *H01Q 1/32* | (2006.01) | |
| *H01Q 1/36* | (2006.01) | |
| *H02J 50/10* | (2016.01) | |

(52) U.S. Cl.
CPC ................. *H01Q 1/32* (2013.01); *H01Q 1/36* (2013.01); *H02J 50/10* (2016.02)

(58) Field of Classification Search
CPC .. H01Q 1/32; H01Q 1/38; H01Q 21/28; H02J 50/00; H02J 50/005; H02J 50/10; H02J 50/27; H02J 50/70; H02J 7/00034; H04B 5/26; H04B 5/263; H01F 38/14
See application file for complete search history.

(56) References Cited

U.S. PATENT DOCUMENTS

| | | | | |
|---|---|---|---|---|
| 9,679,240 | B2* | 6/2017 | Ikemoto | .................... H01Q 7/06 |
| 10,224,632 | B2* | 3/2019 | Tenno | ...................... H01Q 7/06 |
| 2020/0336174 | A1* | 10/2020 | Cheikh | .................... H04W 4/80 |
| 2021/0019590 | A1* | 1/2021 | Destraves | ........ G06K 19/07779 |
| 2022/0200355 | A1* | 6/2022 | Bima | .................. H01F 27/2823 |
| 2022/0209582 | A1* | 6/2022 | Fortes Montilla | ...... H02J 50/60 |

FOREIGN PATENT DOCUMENTS

| | | |
|---|---|---|
| KR | 20150072138 A | 6/2015 |
| WO | 2020234131 A1 | 11/2020 |

OTHER PUBLICATIONS

French Search Report for French Application No. 2206231, dated Feb. 15, 2023 with translation, 9 pages.

* cited by examiner

*Primary Examiner* — Thai Pham
(74) *Attorney, Agent, or Firm* — Buchanan Ingersoll & Rooney PC

(57) ABSTRACT

A communicating device for a motor vehicle, including a control printed circuit board, a first antenna, called "external" antenna, including two groups of windings each arranged around one of the ends of the control printed circuit board, symmetrically with respect to an orthogonal plane, a second antenna, called "internal" antenna, including two groups of windings each arranged around the control printed circuit board between the windings of the first antenna and symmetrically with respect to the orthogonal median plane.

10 Claims, 15 Drawing Sheets

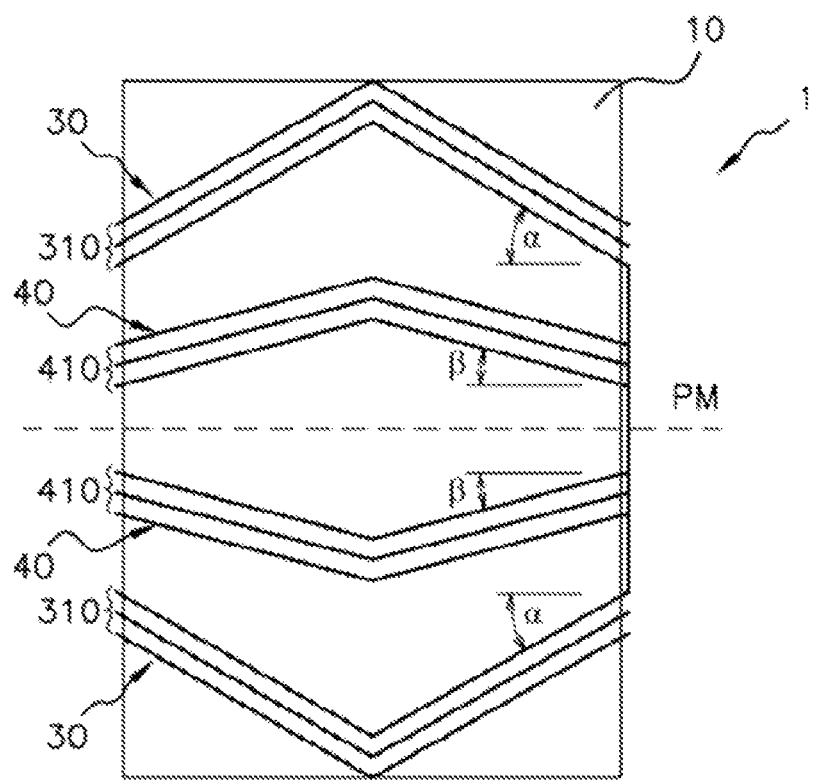

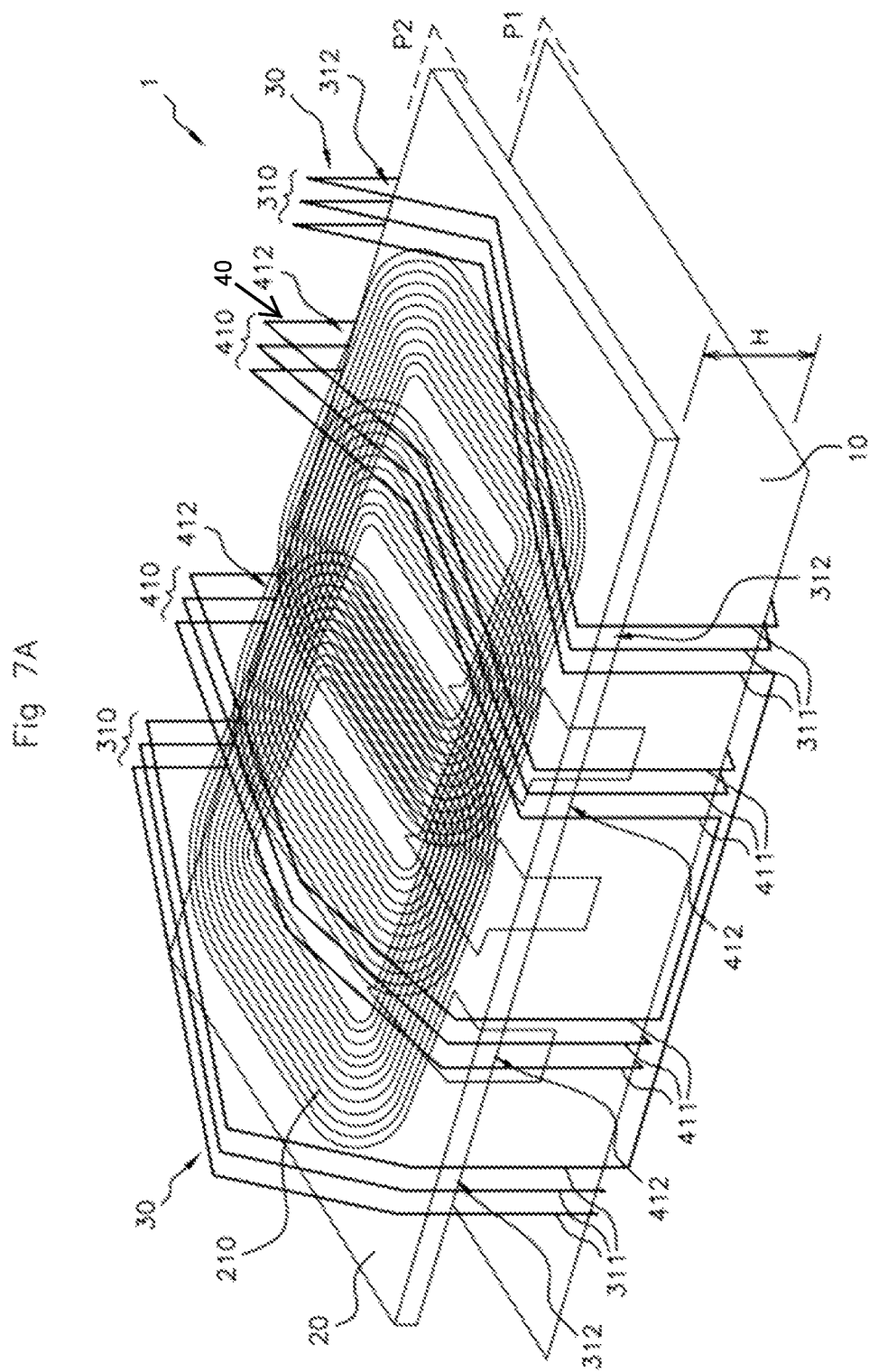

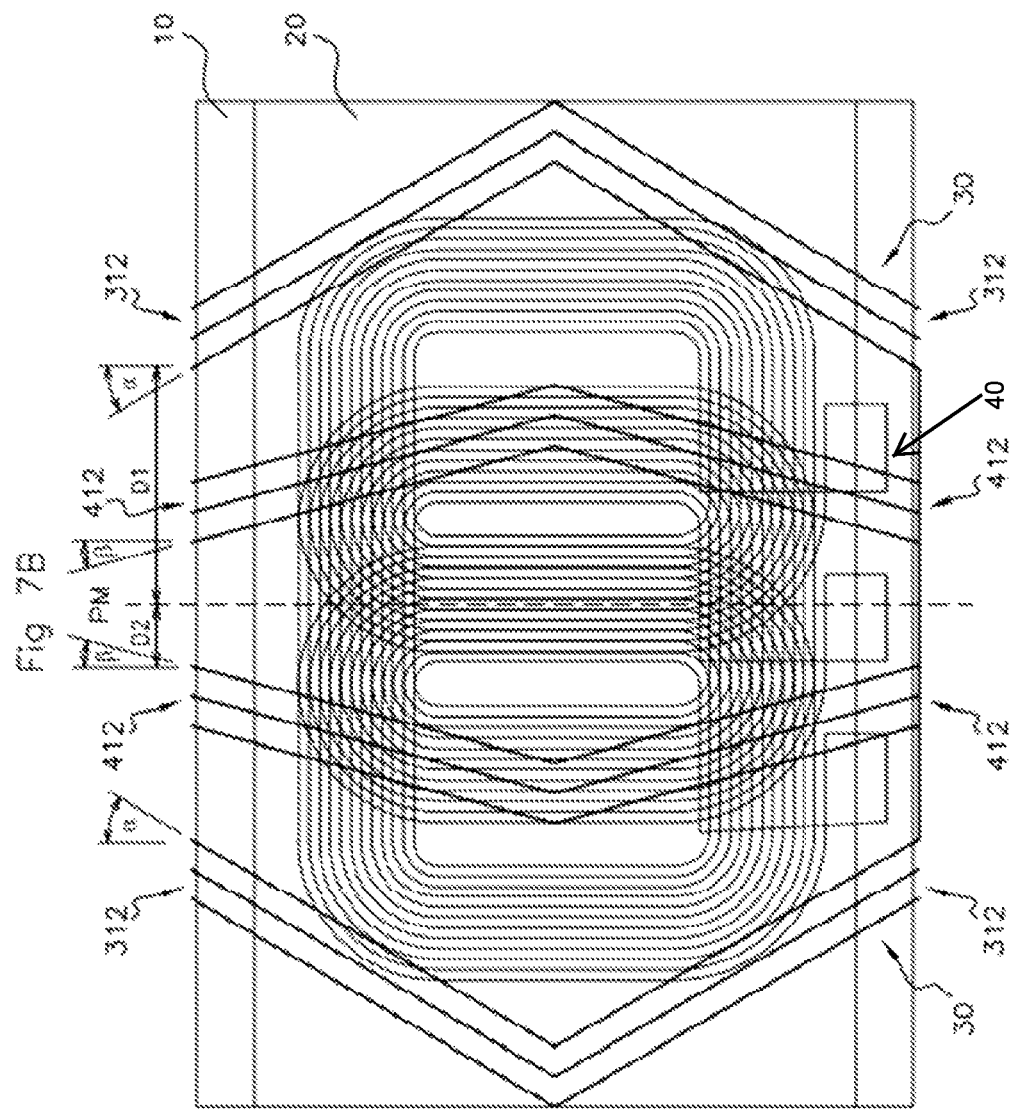

COMMUNICATING DEVICE FOR A MOTOR VEHICLE

CROSS REFERENCE TO RELATED APPLICATIONS

This application claims priority to French Patent Application No. 2206231, filed Jun. 23, 2022, the contents of such application being incorporated by reference herein.

FIELD OF THE INVENTION

The present invention pertains to the field of motor vehicles and relates more particularly to a communicating device for a motor vehicle.

BACKGROUND OF THE INVENTION

In a motor vehicle, it is known to use an induction charger to charge the battery of a smartphone, called WPC (Wireless Power Charging). This charger is mounted beneath a support, installed for example between the front seats of the vehicle, on which the smartphone is placed to be recharged.

In some recent solutions, with the implementation of new functionalities, the charger allows, in addition to inductive charging, wireless communication, for example near field communication (NFC) or communication by GSM (Global System for Mobile) coupling.

One known solution, an example of which is illustrated in FIG. 1, of such a communicating charger 1AA comprises three main elements: a control printed circuit board 10AA, on which the radio electronic components (not visible) are mounted, a charging layer 20AA, placed on top of the control printed circuit board and on which the inductive charging coils are installed, and a communication printed circuit board 30AA, mounted on top of the charging layer and on which a rectangular, planar communication antenna 31AA is mounted. The dimensions of the printed circuit boards 10AA, 30AA are limited with the aim of reducing the costs and the volume needed for installing the charger 1AA. The planar communication antenna 31AA thus radiates substantially at the center of the charging support (not shown for the sake of clarity) in a horizontal plane and allows communication with the antenna of a smartphone placed on the support when said antenna is mounted substantially at the center of the smartphone and likewise radiates in a horizontal plane.

Several problems have arisen recently, however, insofar as the size of smartphones and therefore of support surfaces is increasing and some smartphones now have an additional antenna at each of their ends in order to increase the coverage of the emitted magnetic field by virtue of such antennas also radiating in a vertical plane, orthogonal to the support. In this last case, the coverage of the communication antenna of the charger may not be enough to communicate with the smartphone given that the end antennas of the smartphone will not be within said coverage. More generally, the larger the surface area of the support, the greater the coverage needs to be too. However, motor vehicle manufacturers do not want to increase the dimensions or the costs of existing chargers.

One existing solution, with reference to FIG. 1, that makes it possible to at least partly overcome these drawbacks consists in using three antennas: one horizontal, planar, central antenna 31AA mounted on the communication printed circuit board and two vertical end antennas 32AA, 33AA each placed at one end of the assembly formed by the control printed circuit board 10AA, the charging layer 20AA and the communication printed circuit board 30AA.

This solution proves to be complex and expensive, however, since it requires three matching circuits and three switching circuits. Specifically, each antenna 31AA, 32AA, 33AA is electrically powered one after the other and it is therefore necessary to have one switching circuit per antenna 31AA, 32AA, 33AA and one matching circuit per antenna 31AA, 32AA, 33AA. In addition, the use of such an arrangement of antennas 31AA, 32AA, 33AA requires a large space that is difficult to reduce.

FIG. 2 shows the area of movement ZD of the center CTR of an NFC tag TAG in accordance with the standard PICC class3 when the tag TAG extends perpendicularly to the longitudinal axis of the charger 1AA. FIG. 3 illustrates the NFC coverage of the charger 1AA having three antennas 31AA, 32AA, 33AA in this case. The minimum magnetic field required according to standard ISO 14443 is 1.5 A/m. It can be seen that two areas do not conform (x=0; y=35) and (x=0; y=−33).

FIG. 4 shows the area of movement ZD of the center CTR of an NFC tag TAG in accordance with the standard PICC class3 when the tag TAG extends parallel to the longitudinal axis of the charger 1AA. FIG. 5 illustrates the NFC coverage of the charger 1AA having three antennas 31AA, 32AA, 33AA in this case. The minimum magnetic field required according to standard ISO 14443 is 1.5 A/m. It can be seen that two triangular areas do not conform (x=−20 to 20; y=25 to 35) and (x=−20 to 20; y=−25 to −35).

Therefore, there is a need for a solution that makes it possible to at least partly overcome these drawbacks.

SUMMARY OF THE INVENTION

One of the aims of an aspect of the invention is therefore to provide a simple solution for a device for communicating with a smartphone in a vehicle, in particular with a smartphone comprising one or more end antennas. Another aim of an aspect of the invention is to provide a reliable and effective solution that allows all of the antennas of a smartphone to be within the coverage of the device such that said device can communicate with them. Another aim of an aspect of the invention is to provide a device having a wide coverage without increasing its dimensions with respect to the devices of the prior art.

For this purpose, one subject of the invention is a communicating device for a motor vehicle, said communicating device comprising:
  a control printed circuit board extending along a first plane and comprising electronic control components,
  a first antenna, called "external" antenna, comprising two groups of windings each arranged around one of the ends of the control printed circuit board, symmetrically with respect to an orthogonal median plane,
  a second antenna, called "internal" antenna, comprising two groups of windings each arranged around the control printed circuit board, between the windings of the first antenna and symmetrically with respect to the orthogonal median plane.

The communicating device according to an aspect of the invention thus does not have a communication printed circuit board which makes it less complex and less expensive than the prior solutions. In addition, the communicating device according to an aspect of the invention only requires two matching circuits, compared to three for the prior-art solution, and two switching circuits, compared to three for the prior-art solution. Furthermore, the communicating device according to an aspect of the invention does not have any weakness in the inter-antenna areas.

According to one aspect of the invention, the groups of windings of the first antenna are connected in series and are in phase opposition and electrically connected to the control printed circuit board.

According to another aspect of the invention, the groups of windings of the second antenna are connected in series and are in phase opposition and electrically connected to the control printed circuit board.

According to another aspect of the invention, each group of windings of the first antenna comprises no less than one winding.

In one embodiment, each group of windings of the first antenna comprises three or four windings.

According to another aspect of the invention, each group of windings of the second antenna comprises no less than one winding.

In one embodiment, each group of windings of the second antenna comprises three or four windings.

According to another aspect of the invention, each group of windings of the first antenna is arranged in a V shape.

Preferably, the angle of the windings of the first antenna with respect to the orthogonal median plane is of the order of 30°.

According to one aspect of the invention, each group of windings of the second antenna is arranged in a V shape.

Preferably, the angle of the windings of the second antenna with respect to the median orthogonal plane is greater than 0° and less than 90°.

Preferably, some of the windings of the first antenna and some of the windings of the second antenna are arranged in a second plane, parallel to the first plane while being spaced apart therefrom by a predetermined height. In other words, the cross section of the windings is substantially rectangular.

Preferably, the predetermined height is greater than or equal to 5 mm.

In one embodiment, the predetermined height is comprised between 10 and 25 mm.

In one embodiment, the device further comprises a charging layer comprising a plate surrounded by the first antenna and the second antenna while extending along a second plane, parallel to the first plane, and on which at least one inductive charging coil is arranged extending along said second plane.

Preferably, the plate is made of ferrite.

In one embodiment, the length of the charging layer is greater than 90 mm.

The windings of a group of the first antenna are arranged against the charging layer at two connection areas. The distance between a connection area and the orthogonal median plane of the charging layer is called the first arrangement distance. Advantageously, the first arrangement distance is preferably greater than 20 mm for effective distribution of the magnetic field.

The windings of a group of the second antenna are arranged against the charging layer at two connection areas. The distance between a connection area and the orthogonal median plane of the charging layer is called the second arrangement distance. Advantageously, the arrangement distance of the groups of windings is preferably greater than 5 mm for effective distribution of the magnetic field.

An aspect of the invention also relates to a motor vehicle comprising a communicating device as outlined above, and a charging support designed to receive a communicating device, for example a smartphone, said communicating device being mounted beneath the charging support. The charging support, or pad, preferably has a thickness of less than 6 mm. The dimensions of the charging support are preferably less than 180×90 mm$^2$.

BRIEF DESCRIPTION OF THE DRAWINGS

Further features and advantages of aspects of the invention will become more clearly apparent from reading the following description. This description is purely illustrative and should be read with reference to the appended drawings, in which:

FIG. 6B schematically illustrates the communicating device from FIG. 6A in a plan view.

FIG. 7A schematically illustrates a second embodiment of a communicating device according to the invention, in a perspective view.

FIG. 7B schematically illustrates the communicating device from FIG. 7A in a plan view.

DETAILED DESCRIPTION OF THE PREFERRED EMBODIMENTS

Figure 1:
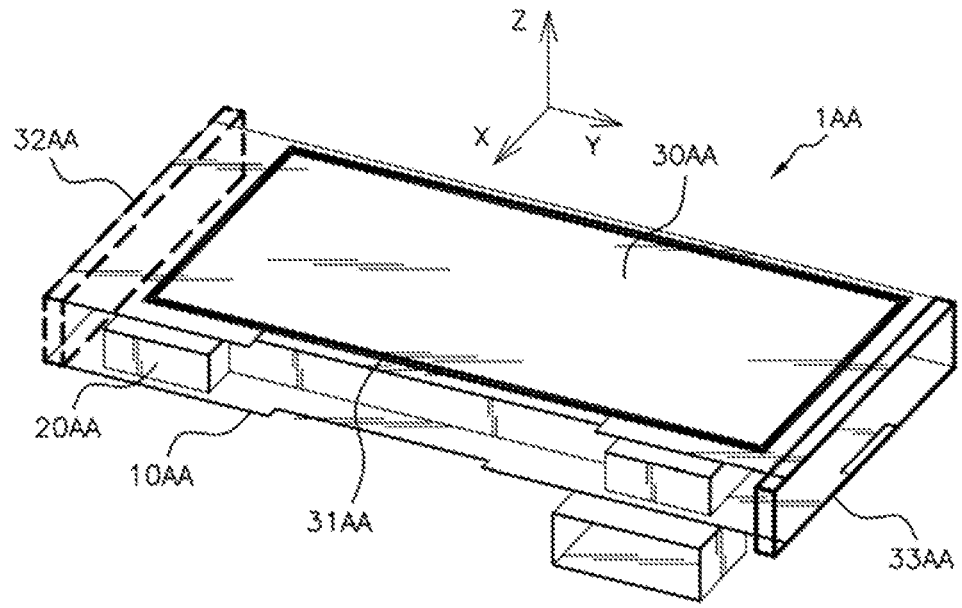
FIG. 1 schematically illustrates one embodiment of a communicating device according to the prior art.
Figure 2:
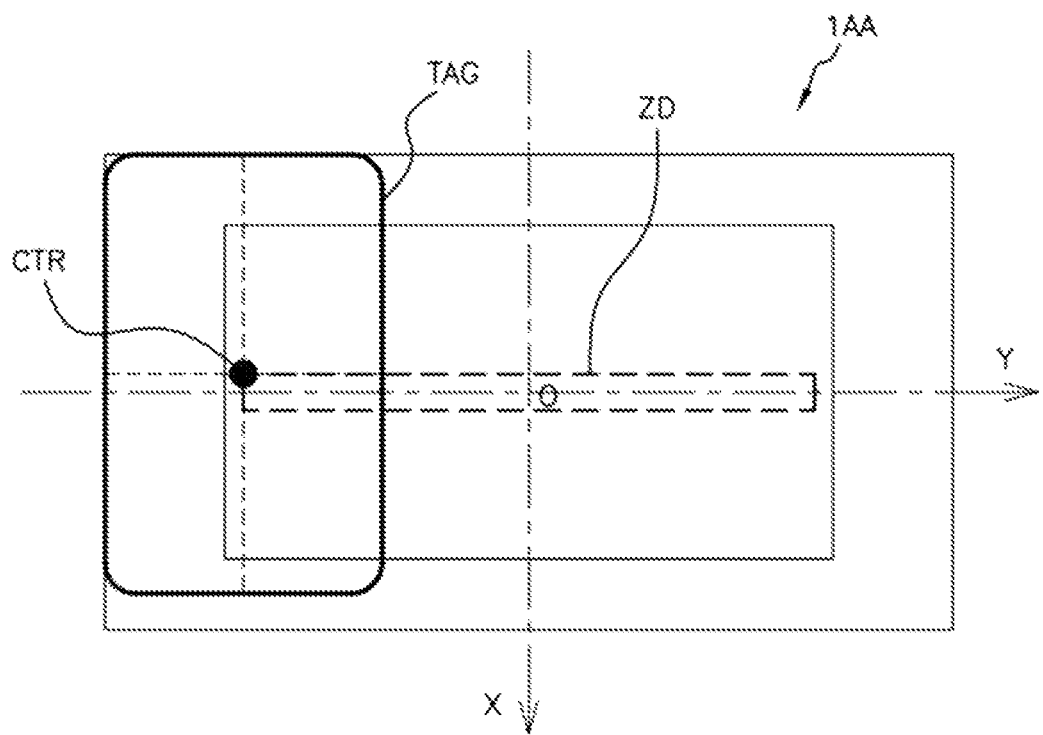
FIG. 2 schematically illustrates the area of movement of the center of a tag when said tag extends perpendicularly to the longitudinal axis of the device.
Figure 3:
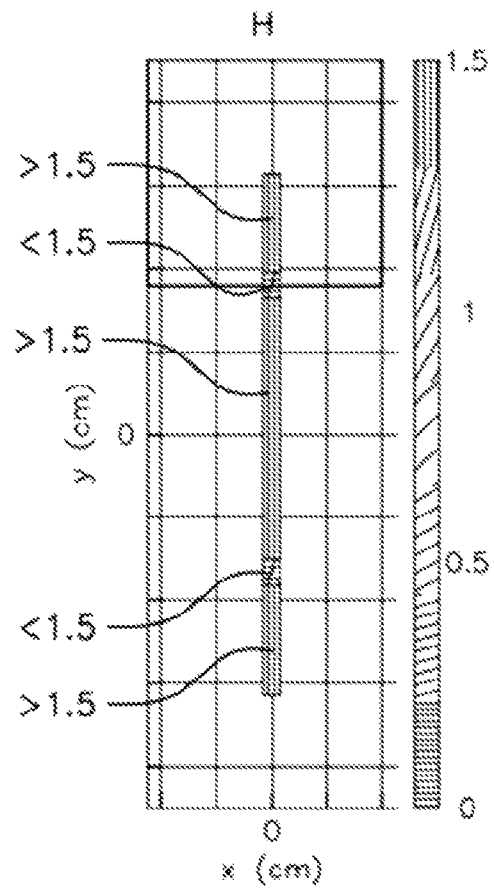
FIG. 3 illustrates an example of a magnetic field diagram when the center of the tag from FIG. 2 moves over the surface of the area of movement.
Figure 4:
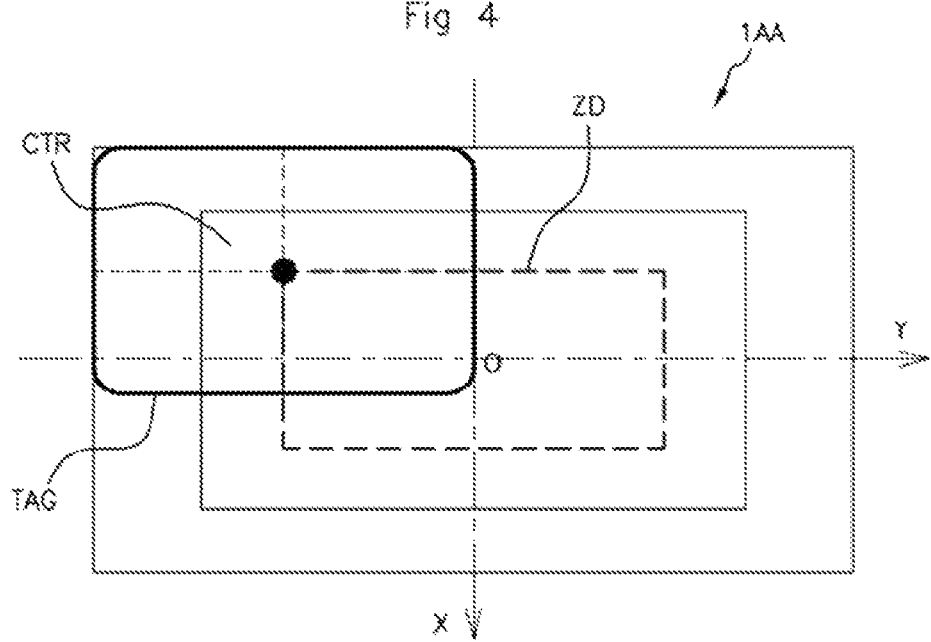
FIG. 4 schematically illustrates the area of movement of the center of a tag when said tag extends parallel to the longitudinal axis of the device.
Figure 5:
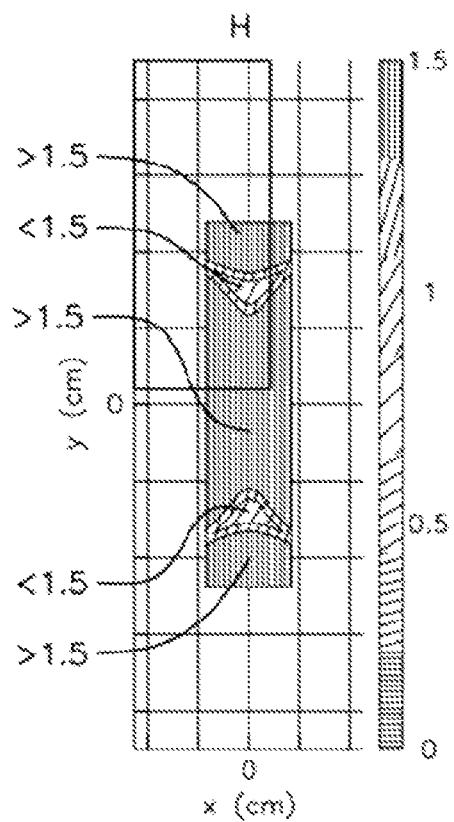
FIG. 5 illustrates an example of a magnetic field diagram when the center of the tag from FIG. 4 moves over the surface of the area of movement.
Figure 6A:
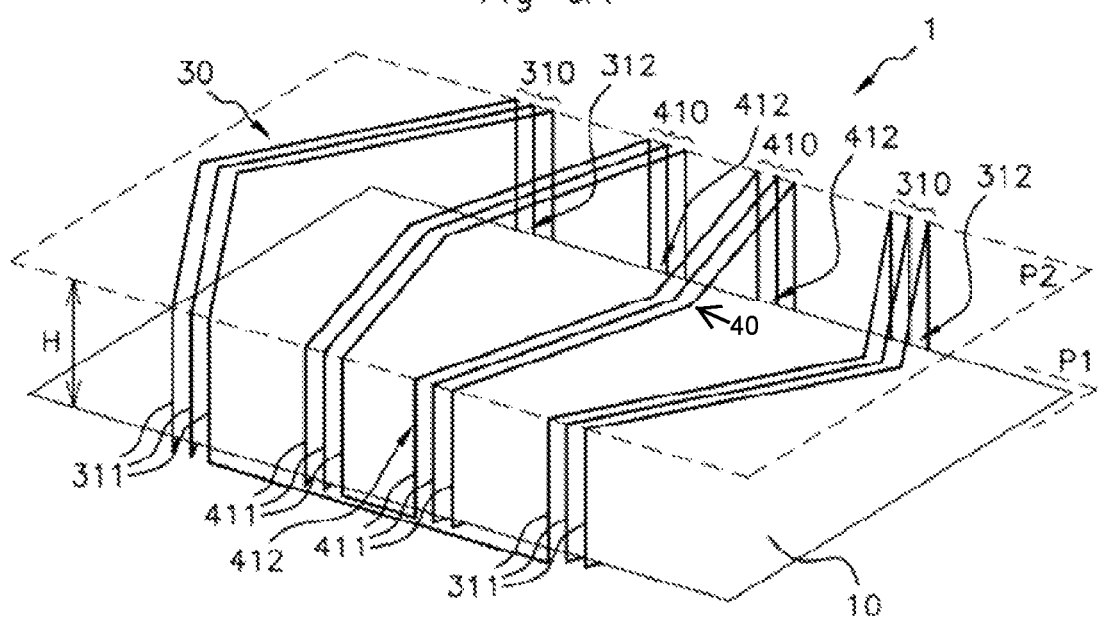
FIG. 6A schematically illustrates a first embodiment of a communicating device according to the invention, in a perspective view.

The communicating device 1 is intended to be mounted beneath a support (called "pad"), for example made of a plastic material, in a motor vehicle (not shown), in a manner known per se.

FIGS. 6A to 7B show two embodiments of the communicating device 1 according to the invention. Only the second embodiment is described hereinbelow for the sake of clarity. The only difference between these two embodiments resides in the fact that the second embodiment additionally has a charging layer comprising inductive charging coils. The description of the first embodiment is therefore included de facto hereinbelow by repeating the description of the second embodiment while omitting the presence of the charging layer.

The communicating device 1 comprises a control printed circuit board 10, a charging layer 20 (in the second embodiment), a first antenna 30 and a second antenna 40.

In this example, the first antenna 30 and the second antenna 40 are of NFC (Near Field Communication) type operating at a center frequency of 13.56 MHz at a maximum distance, for example of the order of 10 cm.

The first antenna 30 and the second antenna 40 make it possible, for example, to detect NFC cards or other NFC objects present on the support of the communicating device 1 in order to prevent these objects from becoming electrically charged and thus protect them from damage due to the magnetic field of the wireless charging.

The first antenna 30 and the second antenna 40 allow, for example, pairing (association) between a smartphone and the vehicle so that the user of the vehicle can perform a plurality of programmable functions such as, for example, starting the engine, automatically adjusting the seats, opening the trunk remotely, etc.

Control Printed Circuit Board 10

The control printed circuit board (PCB) 10 extends along a first plane P1 and comprises electronic control components 110 (not visible in the figures) for controlling the charging layer 20, the first antenna 30 and the second antenna 40.

For this purpose, the control printed circuit board 10 is electrically connected to the charging layer 20, to the first antenna 30 and to the second antenna 40.

Charging Layer 20

The charging layer 20 is a ferrite plate extending along a second plane P2, parallel to the first plane P1.

In this example, the charging layer 20 comprises three planar inductive charging coils 210 extending over the ferrite plate in said second plane P2.

The charging layer 20 and the control printed circuit board 10 are spaced apart by a predetermined height H. The height H is advantageously greater than 5 mm, preferably comprised between 10 and 25 mm, without this being limiting. In the example described, the height H is of the order of 17 mm. As a variant, the height H could be comprised between 9 and 15 mm in order to reduce the dimensions of the communicating device 1.

First Antenna 30

The first antenna 30, called "external" antenna, comprises two groups 310 of windings 311 each arranged around one of the ends of the assembly formed by the control printed circuit board 10 and the charging layer 20, symmetrically with respect to the orthogonal median plane PM of the charging layer 20.

The groups 310 of windings 311 of the first antenna 30 are connected in series and are in phase opposition and electrically connected to the control printed circuit board 10.

In the example of the figures, each group 310 of windings 311 of the first antenna 30 comprises three windings 311. The more windings 311 there are, the more the inductance increases, the less current flows (at input iso-voltage) through the windings 311 and the less magnetic field is emitted by the first antenna 30. The number of four windings 311 therefore constitutes a limit above which the first antenna 30 emits a magnetic field that is too weak for the intended applications.

Each group 310 of windings 311 of the first antenna 30 is arranged in the shape of a V above the charging layer 20, the V pointing toward the outside of the communicating device 1. Preferably, the angle α of the windings 311 with respect to the orthogonal median plane of the charging layer is of the order of 30°.

The windings 311 of a group 310 are arranged against the charging layer at two connection areas 312. The distance between a connection area 312 and the orthogonal median plane PM of the charging layer 20 is called the first arrangement distance D1 (FIG. 7B). The first arrangement distance D1 of the groups 310 of windings 311 is preferably greater than 20 mm.

Second Antenna 40

The second antenna 40, called "internal" antenna, comprises two groups 410 of windings 411 each arranged around the assembly formed by the control printed circuit board 10 and the charging layer 20, between the windings 311 of the first antenna 30 and symmetrically with respect to the orthogonal median plane PM of the charging layer 20.

The groups 410 of windings 411 of the second antenna 40 are connected in series and are in phase opposition and electrically connected to the control printed circuit board 10.

In the example of the figures, each group 410 of windings 411 of the second antenna 40 comprises three windings 411. Preferably, the number of windings 411 is greater than or equal to one. The more windings 411 there are, the more the inductance increases, the less current flows through the windings 411 and the less magnetic field is emitted by the second antenna 40. The number of four windings 411 therefore constitutes a limit above which the second antenna 40 emits a magnetic field that is too weak for the intended applications.

Each group 410 of windings 411 of the second antenna 40 is arranged in the shape of a V and the angle β of the windings 411 with respect to the orthogonal median plane PM of the charging layer 20 is greater than 0° and less than 90°.

The windings 411 of a group 410 are arranged against the charging layer at two connection areas 412. The distance between a connection area 412 and the orthogonal median plane PM of the charging layer 20 is called the second arrangement distance D2 (FIG. 7B). The second arrangement distance D2 of the groups 410 of windings 411 is preferably greater than 5 mm, for example comprised between 5 and 15 mm.

Implementation

FIGS. 8 to 13 and 20 to 25 show different functions showing the cumulative magnetic field distribution measured at the surface of a support, that is to say where a smartphone is placed, having a maximum surface area of 180×90 mm², for a support (pad) thickness of 6 mm, for a height of 17 mm between the control printed circuit board 10 and the charging layer 20, for all the positions of a tag on the support. The x-axes indicate the value of the magnetic field in Ampere per meter (A/m). The y-axes indicate the cumulative distribution as a percentage.

Figure 8:
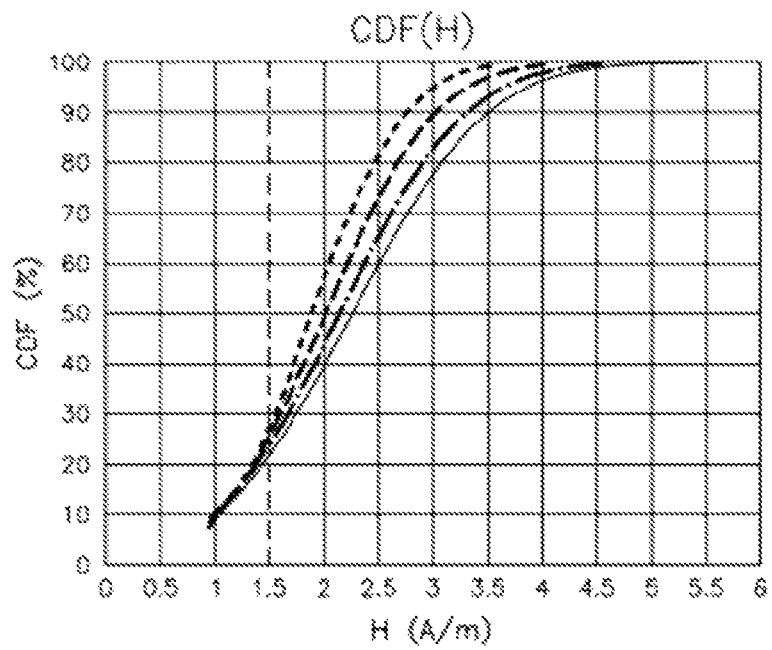
FIG. 8 shows cumulative distribution functions for a plurality of angle values α (deviation angle of the external antenna) when a tag is moved parallel to the longitudinal direction of the device, for a deviation angle of the internal antenna of 0°.

In the example of FIG. 8, several values of the angle α of the groups 310 of windings 311 of the first antenna 30 are tested for a fixed value of 0° of the angle β of the groups 410 of windings 411 of the second antenna 40, for all the movements of the tag parallel to the longitudinal axis of the communicating device 1. It can be seen that for values α=0°, α=15°, α=30°, α=40°, from 8% to 28% of the values are less than the minimum threshold of 1.5 A/m of the standard ISO 14443.

Figure 9:
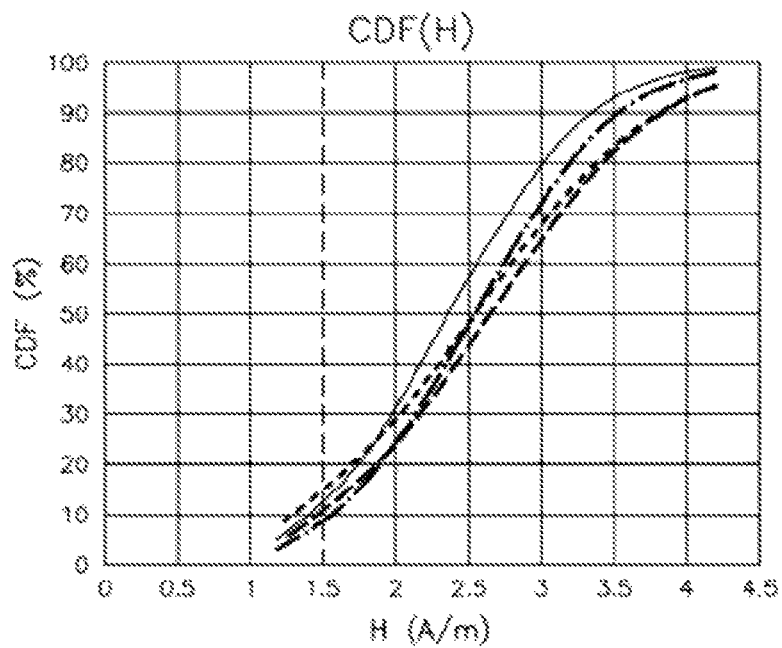
FIG. 9 shows cumulative distribution functions for a plurality of angle values α (deviation angle of the external antenna) when a tag is moved perpendicularly to the longitudinal direction of the device, for a deviation angle of the internal antenna of 0°.

In the example of FIG. 9, the same values of the angle α of the groups 310 of windings 311 of the first antenna 30 are tested for the same fixed value of 0° of the angle β of the groups 410 of windings 411 of the second antenna 40, for all the movements of the tag perpendicularly to the longitudinal axis of the communicating device 1. It can be seen that for values α=0°, α=15°, α=30°, α=40°, from 4% to 17% of the values are less than the minimum threshold of 1.5 A/m of the standard ISO 14443.

However, the examples of FIGS. 8 and 9 show that the value α=30° appears to be the best compromise.

Figure 10:
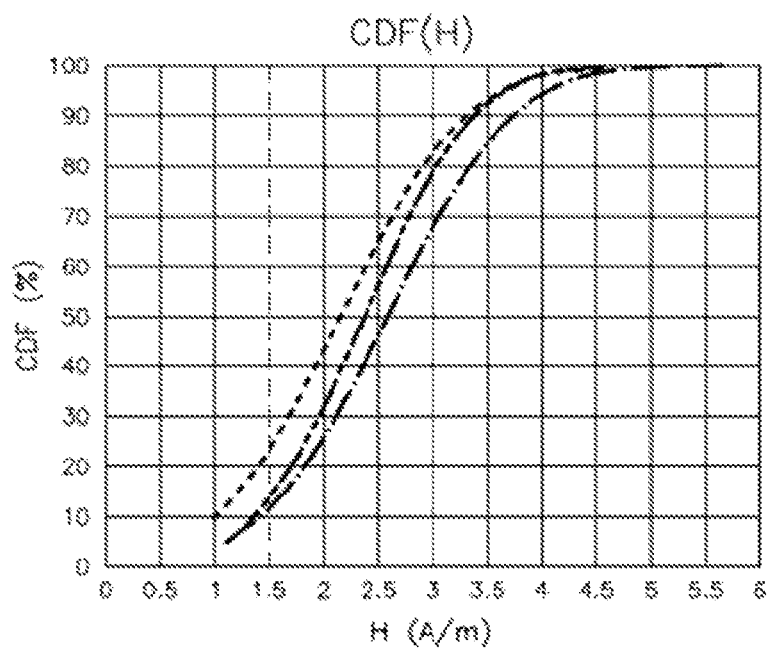
FIG. 10 shows cumulative distribution functions for a plurality of angle values β (deviation angle of the internal antenna), the angle α being fixed at 30°, when a tag is moved parallel to the longitudinal direction of the device.

In the example of FIG. 10, the fixed value 30° of the angle α of the groups 310 of windings 311 of the first antenna 30 is used for several values of the angle β of the groups 410 of windings 411 of the second antenna 40, for all the movements of the tag parallel to the longitudinal axis of the communicating device 1. It can be seen that for values β=0°, 25% of the values are less than the minimum threshold of 1.5 A/m, for β=15°, 14% of the values are less than the minimum threshold of 1.5 A/m and for β=30°, 12% of the values are less than the minimum threshold of 1.5 A/m.

Figure 11:
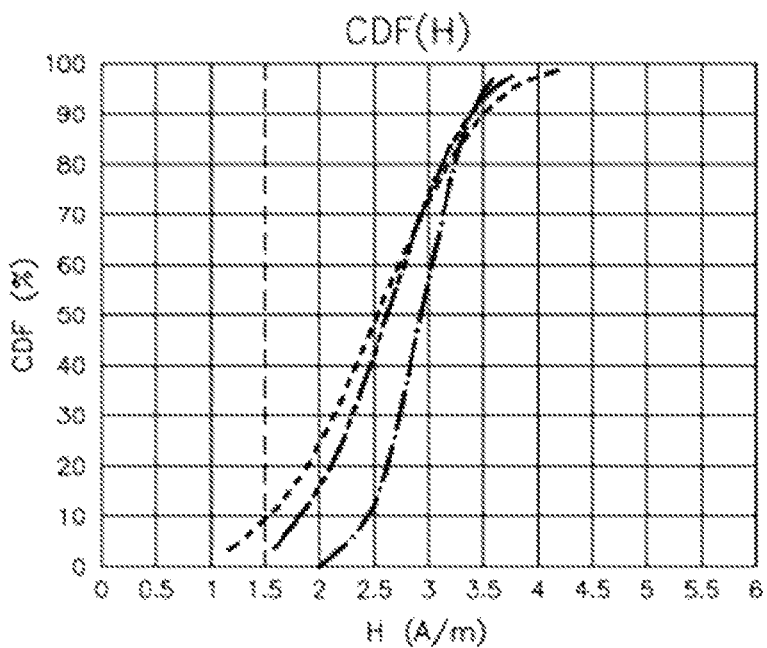
FIG. 11 shows cumulative distribution functions for a plurality of angle values β (deviation angle of the internal antenna), the angle α being fixed at 30°, when a tag is moved perpendicularly to the longitudinal direction of the device.

In the example of FIG. 11, the fixed value 30° of the angle α of the groups 310 of windings 311 of the first antenna 30 is used for several values of the angle β of the groups 410 of windings 411 of the second antenna 40, for all the movements of the tag perpendicularly to the longitudinal axis of the communicating device 1. It can be seen that for values β=0°, 9% of the values are less than the minimum threshold of 1.5 A/m, for β=15° and for β=30°, all of the values are greater than the minimum threshold of 1.5 A/m.

The examples of FIGS. 10 and 11 thus show that the values of β comprised between 15° and 30° appear to be the best compromise.

Figure 12:
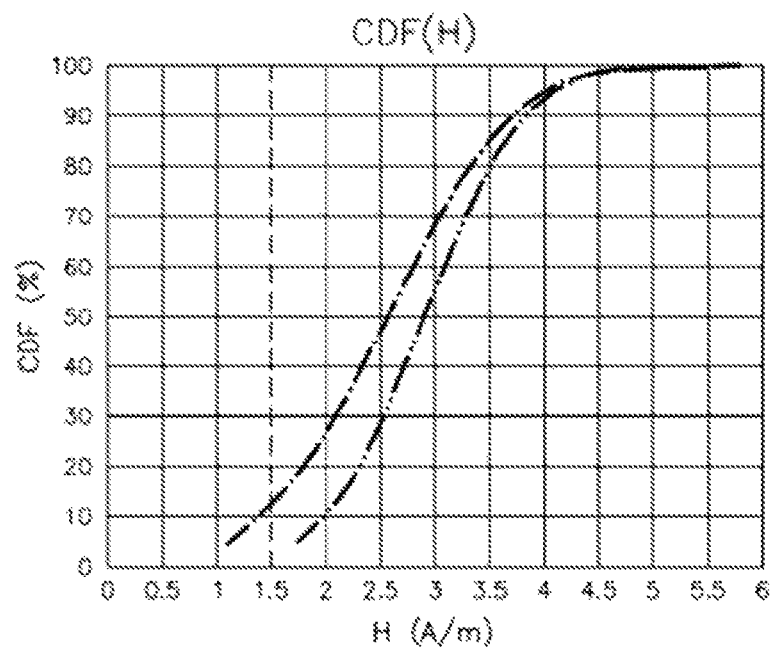
FIG. 12 shows cumulative distribution functions for two pairs of values of the first arrangement distance and of the second arrangement distance, the angle α being fixed at 30° and the angle β being fixed at 30°, when a tag is moved parallel to the longitudinal direction of the device.

In the example of FIG. 12, the fixed values α=30° and β=30° are used for all the movements of the tag parallel to the longitudinal axis of the communicating device 1. In a first case, the first arrangement distance D1 is 24 mm and the second arrangement distance D2 is 5 mm. It can then be seen that 12% of the values are less than the minimum threshold of 1.5 A/m. In a second case, the first arrangement distance D1 is 32 mm and the second arrangement distance D2 is 9 mm. It can then be seen that all of the values are greater than the minimum threshold of 1.5 A/m.

Figure 13:
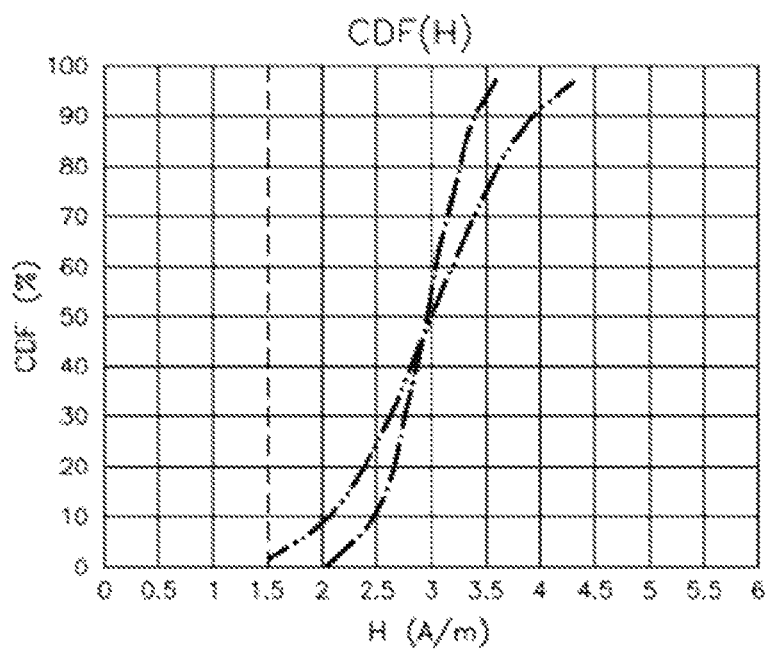
FIG. 13 shows cumulative distribution functions for two pairs of values of the first arrangement distance and of the second arrangement distance, the angle α being fixed at 30° and the angle β being fixed at 30°, when a tag is moved perpendicularly to the longitudinal direction of the device.

In the example of FIG. 13, the fixed values α=30° and β=30° are used for all the movements of the tag perpendicularly to the longitudinal axis of the communicating device 1. In a first case, the first arrangement distance D1 is 24 mm and the second arrangement distance D2 is 5 mm. It can then be seen that all of the values are greater than the minimum threshold of 1.5 A/m. In a second case, the first arrangement distance D1 is 32 mm and the second arrangement distance D2 is 9 mm. It can then be seen that all of the values are greater than the minimum threshold of 1.5 A/m.

In the examples of FIGS. 14 to 19, the fixed values α=30° and β=30° are used for all the movements of the tag.

Figure 14:
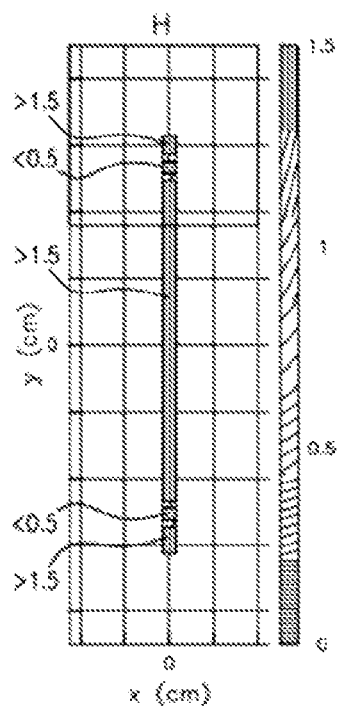
FIG. 14 shows the contribution of the first antenna to the magnetic field of the communicating device for all the movements of the tag perpendicularly to the longitudinal axis of the communicating device.

FIG. 14 shows the contribution of the first antenna 30 to the magnetic field of the communicating device 1 for all the movements of the tag perpendicularly to the longitudinal axis of the communicating device 1. It can be seen that two areas have values less than the minimum threshold of 1.5 A/m.

Figure 15:
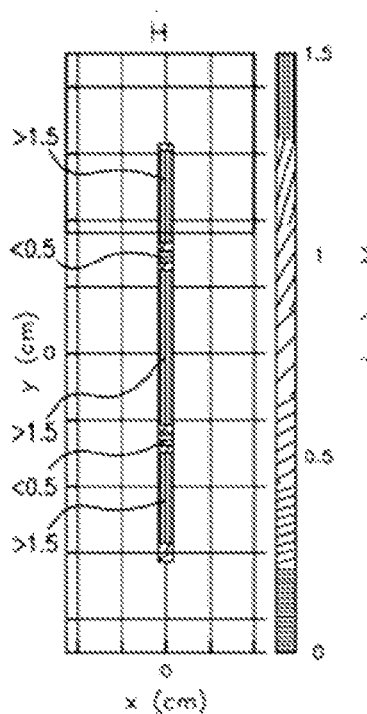
FIG. 15 shows the contribution of the second antenna to the magnetic field of the communicating device for all the movements of the tag perpendicularly to the longitudinal axis of the communicating device.

FIG. 15 shows the contribution of the second antenna 40 to the magnetic field of the communicating device 1 for all the movements of the tag perpendicularly to the longitudinal axis of the communicating device 1. It can be seen that two areas have values less than the minimum threshold of 1.5 A/m.

Figure 16:
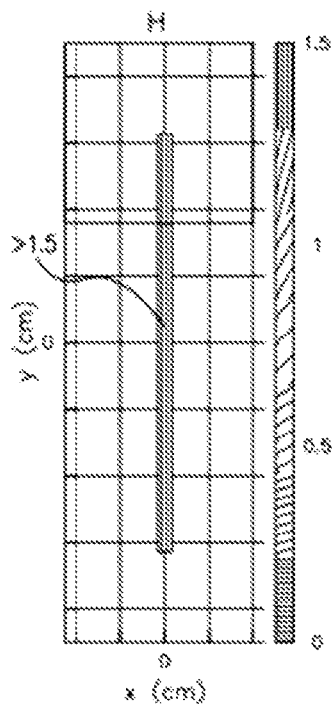
FIG. 16 shows the combined contribution of the first antenna and of the second antenna to the magnetic field of the communicating device for all the movements of the tag perpendicularly to the longitudinal axis of the communicating device.

FIG. 16 shows the combined contribution of the first antenna 30 and of the second antenna 40 to the magnetic field of the communicating device 1 for all the movements of the tag perpendicularly to the longitudinal axis of the communicating device 1. It can be seen that all of the magnetic field values are greater than the minimum threshold of 1.5 A/m.

Figure 17:
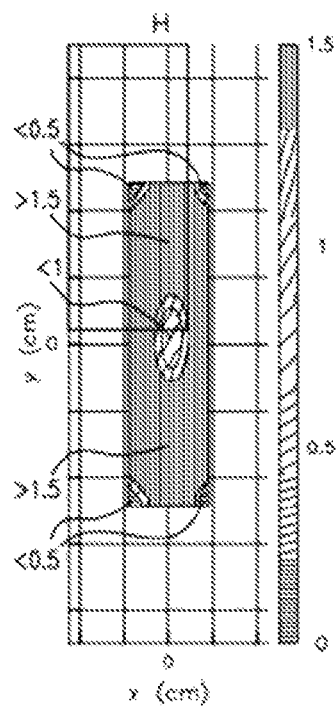
FIG. 17 shows the contribution of the first antenna to the magnetic field of the communicating device for all the movements of the tag parallel to the longitudinal axis of the communicating device.

FIG. 17 shows the contribution of the first antenna 30 to the magnetic field of the communicating device 1 for all the movements of the tag parallel to the longitudinal axis of the communicating device 1. It can be seen that the central area and the four corners of the movement area ZD have values less than the minimum threshold of 1.5 A/m.

Figure 18:
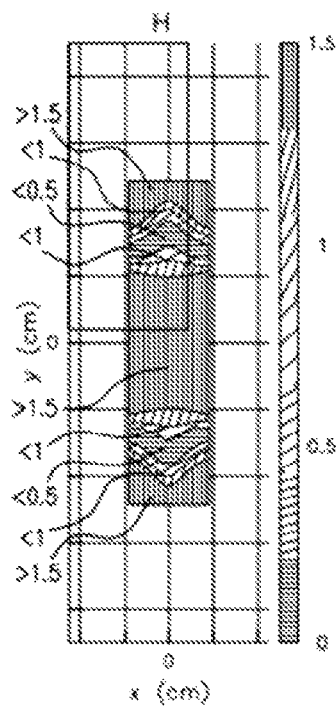
FIG. 18 shows the contribution of the second antenna to the magnetic field of the communicating device for all the movements of the tag parallel to the longitudinal axis of the communicating device.

FIG. 18 shows the contribution of the second antenna 40 to the magnetic field of the communicating device 1 for all the movements of the tag parallel to the longitudinal axis of the communicating device 1. It can be seen that two areas in the upper part and two areas in the lower part have values less than the minimum threshold of 1.5 A/m.

Figure 19:
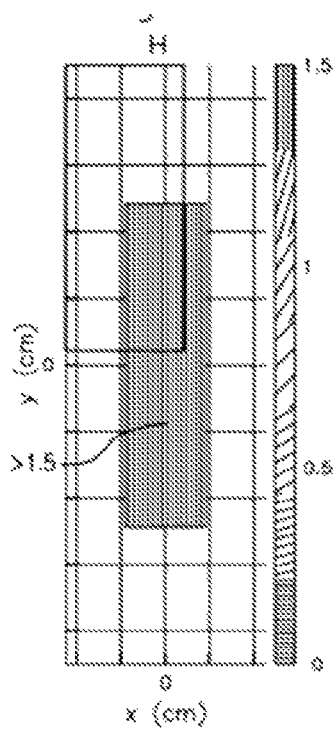
FIG. 19 shows the combined contribution of the first antenna and of the second antenna to the magnetic field of the communicating device for all the movements of the tag parallel to the longitudinal axis of the communicating device.

FIG. 19 shows the combined contribution of the first antenna 30 and of the second antenna 40 to the magnetic field of the communicating device 1 for all the movements of the tag parallel to the longitudinal axis of the communicating device 1. It can be seen that all of the magnetic field values are greater than the minimum threshold of 1.5 A/m.

Figure 20:
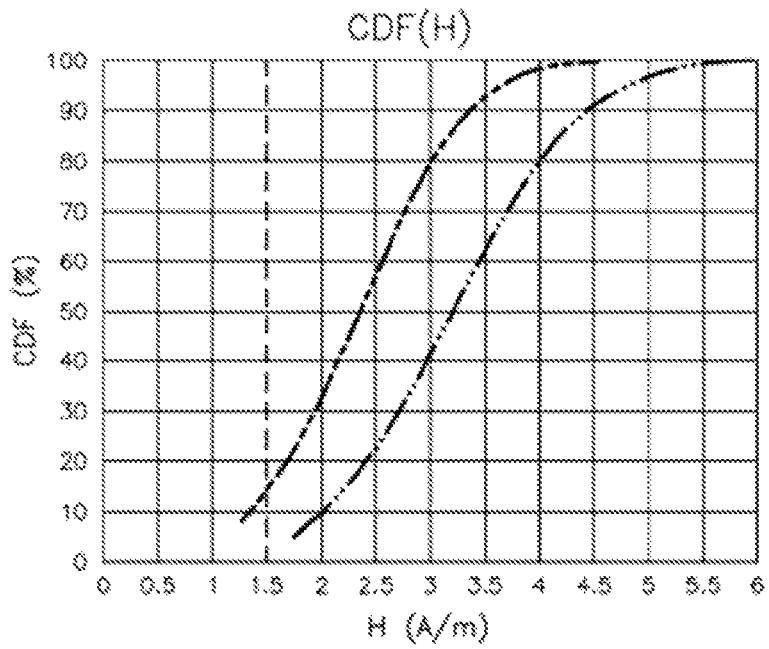
FIG. 20 shows cumulative distribution functions for two pairs of values of the first arrangement distance and of the second arrangement distance, the angle α being fixed at 30° and the angle β being fixed at 15°, when a tag is moved parallel to the longitudinal direction of the device.

In the example of FIG. 20, the fixed values $\alpha=30°$ and $\beta=15°$ are used for all the movements of the tag parallel to the longitudinal axis of the communicating device 1. In a first case, the first arrangement distance D1 is 24 mm and the second arrangement distance D2 is 7.5 mm. It can then be seen that 14% of the values are less than the minimum threshold of 1.5 A/m. In a second case, the first arrangement distance D1 is 28 mm and the second arrangement distance D2 is 11.5 mm. It can then be seen that all of the values are greater than the minimum threshold of 1.5 A/m.

Figure 21:
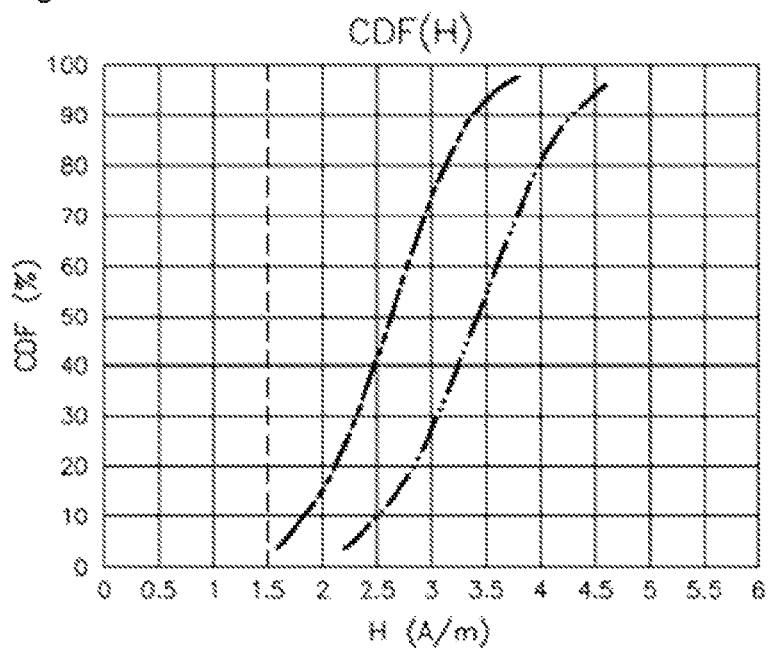
FIG. 21 shows cumulative distribution functions for two pairs of values of the first arrangement distance and of the second arrangement distance, the angle α being fixed at 30° and the angle β being fixed at 15°, when a tag is moved perpendicularly to the longitudinal direction of the device.

In the example of FIG. 21, the fixed values $\alpha=30°$ and $\beta=15°$ are used for all the movements of the tag perpendicularly to the longitudinal axis of the communicating device 1. In a first case, the first arrangement distance D1 is 24 mm and the second arrangement distance D2 is 7.5 mm. It can then be seen that all of the values are greater than the minimum threshold of 1.5 A/m. In a second case, the first arrangement distance D1 is 28 mm and the second arrangement distance D2 is 11.5 mm. It can then be seen that all of the values are greater than the minimum threshold of 1.5 A/m.

Figure 22:
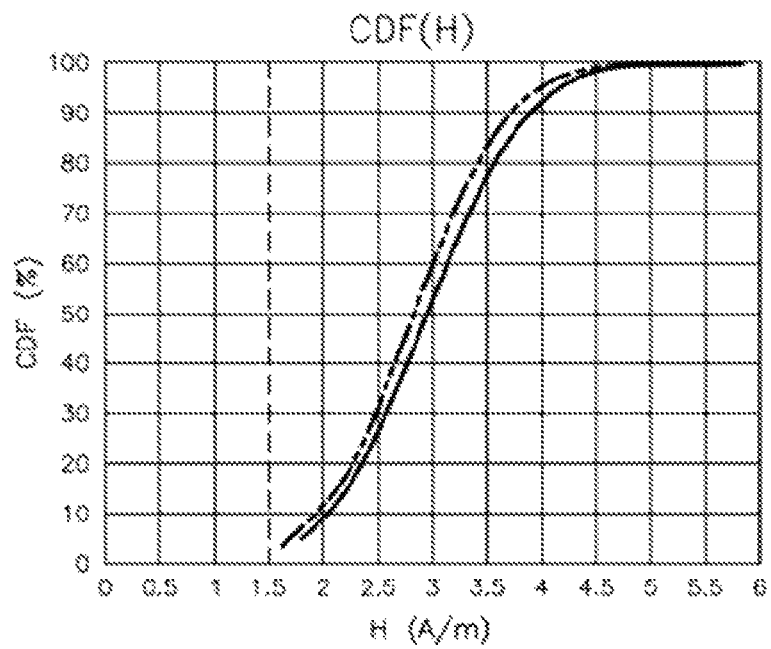
FIG. 22 shows cumulative distribution functions for values of the second arrangement distance, the angle α being fixed at 30° and the angle β being fixed at 30° and at 15° for a height between the control printed circuit board and the charging layer of 20 mm, when a tag is moved parallel to the longitudinal direction of the device.
Figure 23:
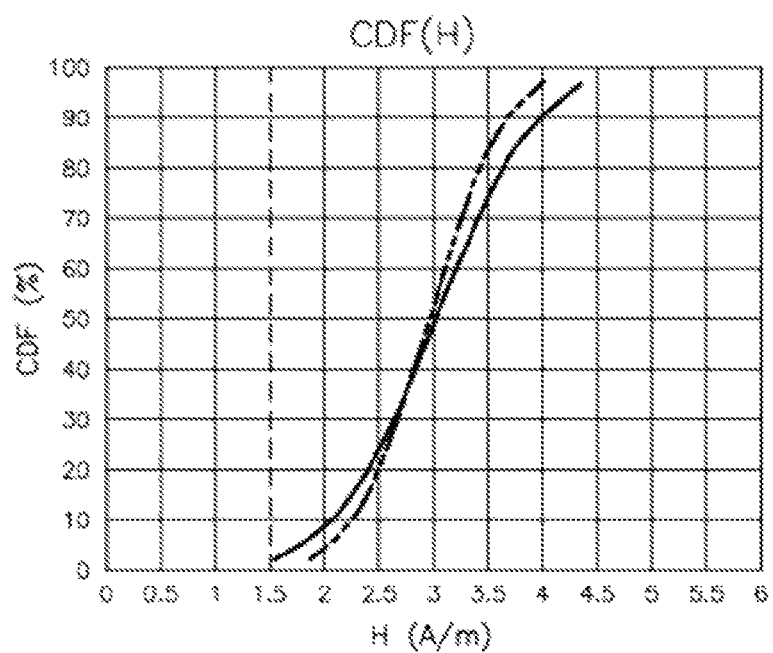
FIG. 23 shows cumulative distribution functions for values of the second arrangement distance, the angle α being fixed at 30° and the angle β being fixed at 30° and at 15° for a height between the control printed circuit board and the charging layer of 20 mm, when a tag is moved perpendicularly to the longitudinal direction of the device.

In the examples of FIGS. 22 and 23, the height between the control printed circuit board 10 and the charging layer 20 is modified so as to range from 17 mm to 20 mm.

In the example of FIG. 22, in a first case, the fixed values $\alpha=30°$ and $\beta=15°$ are used for all the movements of the tag parallel to the longitudinal axis of the communicating device 1, the first arrangement distance D1 is 32 mm and the second arrangement distance D2 is 9 mm. It can then be seen that all of the values are greater than the minimum threshold of 1.5 A/m. In a second case, the fixed values $\alpha=30°$ and $\beta=15°$ are used for all the movements of the tag parallel to the longitudinal axis of the communicating device 1, the first arrangement distance D1 is 28 mm and the second arrangement distance D2 is 11.5 mm. It can then be seen that all of the values are greater than the minimum threshold of 1.5 A/m.

In the example of FIG. 23, in a first case, the fixed values $\alpha=30°$ and $\beta=15°$ are used for all the movements of the tag perpendicularly to the longitudinal axis of the communicating device 1, the first arrangement distance D1 is 32 mm and the second arrangement distance D2 is 9 mm. It can be seen that all of the values are greater than the minimum threshold of 1.5 A/m. In a second case, the fixed values $\alpha=30°$ and $\beta=15°$ are used for all the movements of the tag perpendicularly to the longitudinal axis of the communicating device 1, the first arrangement distance D1 is 28 mm and the second arrangement distance D2 is 11.5 mm. It can then be seen that all of the values are greater than the minimum threshold of 1.5 A/m.

Figure 24:
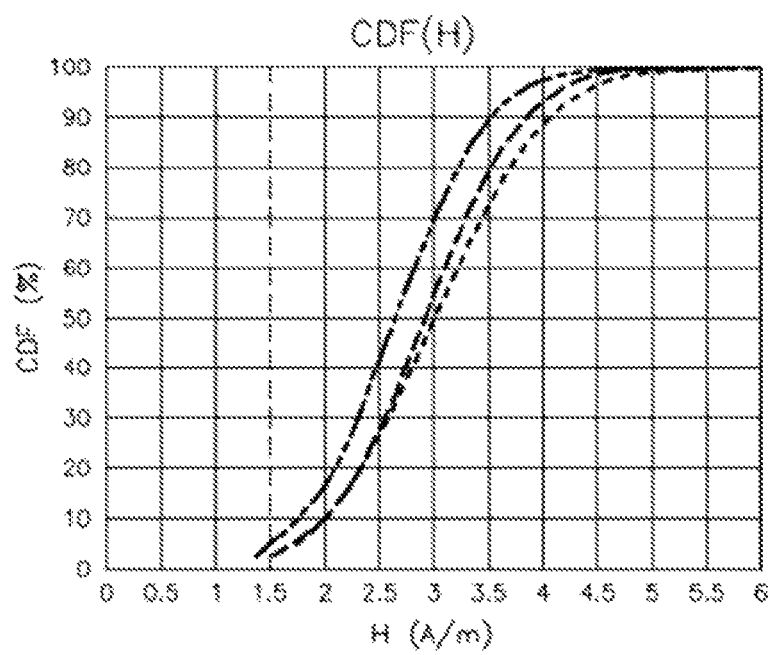
FIG. 24 shows three cumulative distribution functions for values of the second arrangement distance, of different angle α and angle β and for a length of the ferrite plate of the charging layer of 90 to 100 mm, when a tag is moved parallel to the longitudinal direction of the device.
Figure 25:
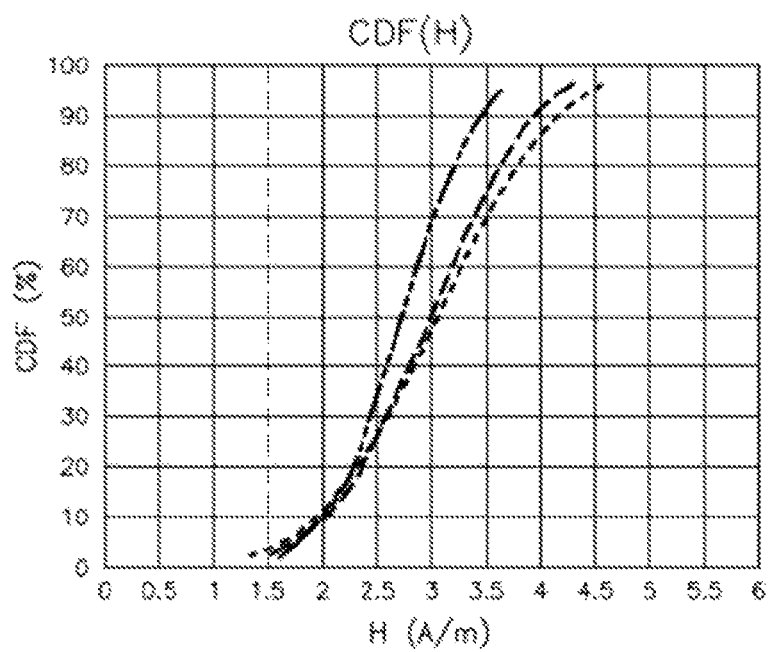
FIG. 25 shows three cumulative distribution functions for values of the second arrangement distance, of different angle α and angle β and for a length of the ferrite plate of the charging layer of 90 to 100 mm, when a tag is moved perpendicularly to the longitudinal direction of the device.

In the examples of FIGS. 24 and 25, the height between the control printed circuit board 10 and the charging layer 20 is 17 mm and different lengths of the ferrite charging layer 20 are tested.

In the example of FIG. 24, in a first case, the fixed values $\alpha=30°$ and $\beta=30°$ are used for all the movements of the tag parallel to the longitudinal axis of the communicating device 1, the first arrangement distance D1 of the first antenna 30 is 32 mm, the second arrangement distance D2 is 9 mm and the length of the charging layer 20 is 100 mm. It can then be seen that all of the values are greater than the minimum threshold of 1.5 A/m. In a second case, the fixed values $\alpha=30°$ and $\beta=30°$ are used for all the movements of the tag parallel to the longitudinal axis of the communicating device 1, the first arrangement distance D1 is 32 mm, the second arrangement distance D2 is 9 mm and the length of the charging layer 20 is 90 mm. It can then be seen that all of the values are greater than the minimum threshold of 1.5 A/m. In a third case, the fixed values $\alpha=30°$ and $\beta=15°$ are used for all the movements of the tag parallel to the longitudinal axis of the communicating device 1, the first arrangement distance D1 is 28 mm, the second arrangement distance D2 is 11.5 mm and the length of the charging layer 20 is 90 mm. It can then be seen that 5% of the values are less than the minimum threshold of 1.5 A/m.

In the example of FIG. 25, in a first case, the fixed values $\alpha=30°$ and $\beta=30°$ are used for all the movements of the tag perpendicularly to the longitudinal axis of the communicating device 1, the first arrangement distance D1 is 32 mm, the second arrangement distance D2 is 9 mm and the length of the charging layer 20 is 100 mm. It can then be seen that all of the values are greater than the minimum threshold of 1.5 A/m. In a second case, the fixed values $\alpha=30°$ and $\beta=30°$ are used for all the movements of the tag perpendicularly to the longitudinal axis of the communicating device 1, the first arrangement distance D1 is 32 mm, the second arrangement distance D2 is 9 mm and the length of the charging layer 20 is 90 mm. It can then be seen that 4% of the values are less than the minimum threshold of 1.5 A/m. In a third case, the fixed values $\alpha=30°$ and $\beta=15°$ are used for all the movements of the tag perpendicularly to the longitudinal axis of the communicating device 1, the first arrangement distance D1 is 28 mm, the second arrangement distance D2 is 11.5 mm and the length of the charging layer 20 is 90 mm. It can then be seen that all of the values are greater than the minimum threshold of 1.5 A/m.

The arrangement according to an aspect of the invention therefore makes it possible to achieve magnetic field values greater than the minimum threshold of 1.5 A/m for certain determined values of the angles $\alpha$ and $\beta$, of the first arrangement distance D1, of the second arrangement distance D2 and of the length of the charging layer 20, this in particular making it possible to increase the surface area of the smartphone support, for example from 170×85 mm² to 180×90 mm². Thus, for a value of $\alpha$ of 30°, a value of $\beta$ comprised between 15° and a value of the first arrangement distance D1 comprised between 28 and 32 mm, a value of the second arrangement distance D2 comprised between 7 and 12 mm and a length of the ferrite charging layer 20 comprised between 90 and 100 mm, a coverage in accordance with the standard ISO 14443 is assured over a support surface area of 180×90 mm².

The invention claimed is:

1. A communicating device for a motor vehicle, said communicating device comprising:
   a control printed circuit board extending along a first plane and comprising electronic control components,
   a first set of antenna, called "external" antenna, comprising two groups of windings each group arranged around one of the ends of the control printed circuit board, symmetrically with respect to an orthogonal median plane,
   a second set of antenna, called "internal" antenna, comprising two groups of windings each group arranged around the control printed circuit board, between the windings of the first set of antenna and symmetrically with respect to the orthogonal median plane.

2. The communicating device as claimed in claim 1, wherein the groups of windings of the first set of antenna are connected in series and are in phase opposition and electrically connected to the control printed circuit board.

3. The communicating device as claimed in claim 1, wherein the groups of windings of the second set of antenna are connected in series and are in phase opposition and electrically connected to the control printed circuit board.

4. The communicating device as claimed in claim 1, wherein each group of windings of the first set of antenna comprises no less than one winding.

5. The communicating device as claimed in claim 1, wherein each group of windings of the second set of antenna comprises no less than one winding.

6. The communicating device as claimed in claim 1, wherein each group of windings of the first set of antenna is arranged in a V shape.

7. The communicating device as claimed in claim 6, wherein an angle of the windings with respect to the orthogonal median plane is greater than 0° and less than 90°.

8. The communicating device as claimed in claim 1, wherein each group of windings of the second set of antenna is arranged in a V shape.

9. The communicating device as claimed in claim 8, wherein an angle of the windings with respect to the orthogonal median plane is greater than 0° and less than 90°.

10. A motor vehicle comprising a communicating device as claimed in claim 1.

* * * * *